United States Patent
Shannon et al.

(10) Patent No.: US 12,554,640 B2
(45) Date of Patent: *Feb. 17, 2026

(54) APPARATUSES, SYSTEMS, AND METHODS FOR CONTROLLING CACHE ALLOCATIONS IN A CONFIGURABLE COMBINED PRIVATE AND SHARED CACHE IN A PROCESSOR-BASED SYSTEM

(71) Applicant: Ampere Computing LLC, Santa Clara, CA (US)

(72) Inventors: Richard James Shannon, Portland, OR (US); Stephan Jean Jourdan, Santa Clara, CA (US); Matthew Robert Erler, Portland, OR (US); Jared Eric Bendt, Hillsboro, OR (US)

(73) Assignee: Ampere Computing LLC, Santa Clara, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/623,366

(22) Filed: Apr. 1, 2024

(65) Prior Publication Data
US 2024/0248843 A1    Jul. 25, 2024

Related U.S. Application Data

(63) Continuation of application No. 17/834,697, filed on Jun. 7, 2022, now Pat. No. 11,947,454.
(Continued)

(51) Int. Cl.
*G06F 12/0802* (2016.01)
*G06F 12/084* (2016.01)

(52) U.S. Cl.
CPC .... *G06F 12/0802* (2013.01); *G06F 2212/604* (2013.01)

(58) Field of Classification Search
CPC ............... G06F 12/0802; G06F 2212/604
(Continued)

(56) References Cited

U.S. PATENT DOCUMENTS 5,875,464 A    2/1999 Kirk
7,287,254 B2 * 10/2007 Miller ............... G06F 9/5061
                                                              718/102
(Continued)

FOREIGN PATENT DOCUMENTS

CN       107870871 A     4/2018
DE     102023104846 A1    9/2023
(Continued)

OTHER PUBLICATIONS

ARM, "AMBA 5 CHI Architecture Specification," ARM IHI 0050E. b, Aug. 16, 2021, ARM Limited, 508 pages.
(Continued)

*Primary Examiner* — Arpan P. Savla
*Assistant Examiner* — Sidney Li
(74) *Attorney, Agent, or Firm* — Withrow & Terranova, PLLC (57) ABSTRACT

Apparatuses, systems, and methods for controlling cache allocations in a configurable combined private and shared cache in a processor-based system. The processor-based system is configured to receive a cache allocation request to allocate a line in a share cache structure, which may further include a client identification (ID). The cache allocation request and the client ID can be compared to a sub-non-uniform memory access (NUMA) (sub-NUMA) bit mask and a client allocation bit mask to generate a cache allocation vector. The sub-NUMA bit mask may have been programmed to indicate that processing cores associated with a sub-NUMA region are available, whereas processing cores associated with other sub-NUMA regions are not available,
(Continued)

and the client allocation bit mask may have been programmed to indicate that processing cores are available. The sub-NUMA bit mask and the client allocation bit mask can be combined to create a cache allocation vector that a cache allocation request to allocate a line serviced by one of processing cores.

20 Claims, 6 Drawing Sheets

Related U.S. Application Data (60) Provisional application No. 63/208,746, filed on Jun. 9, 2021.

(58) Field of Classification Search
USPC .......................................................... 711/118
See application file for complete search history.

(56) References Cited

U.S. PATENT DOCUMENTS

| | | | |
|---|---|---|---|
| 7,853,752 | B1 | 12/2010 | Agarwal et al. |
| 8,543,769 | B2 | 9/2013 | Rajamony et al. |
| 11,880,306 | B2 | 1/2024 | Shannon et al. |
| 11,947,454 | B2 | 4/2024 | Shannon et al. |
| 12,007,896 | B2 | 6/2024 | Shannon et al. |
| 2007/0143546 | A1 | 6/2007 | Narad |
| 2009/0249094 | A1* | 10/2009 | Marshall ............... G06F 1/329 713/320 |
| 2011/0161943 | A1* | 6/2011 | Bellows ............... G06F 9/5066 717/149 |
| 2012/0198172 | A1* | 8/2012 | Lin ..................... G06F 12/0842 711/129 |
| 2013/0138891 | A1 | 5/2013 | Chockler et al. |
| 2013/0205119 | A1 | 8/2013 | Rajwar et al. |
| 2014/0040556 | A1 | 2/2014 | Walker |
| 2014/0201452 | A1 | 7/2014 | Meredith |
| 2019/0065374 | A1* | 2/2019 | Hower ................. G06F 13/1663 |

FOREIGN PATENT DOCUMENTS

| | | |
|---|---|---|
| JP | 2001282617 A | 10/2001 |
| WO | 2020256610 A1 | 12/2020 |
| WO | 2021066844 A1 | 4/2021 |

OTHER PUBLICATIONS

Tsai, W.-Y, et al., "A Port-Configuration Assisted NIC IRQ Affinitization Scheme for Multi-Core Packet Forwarding Applications," 2012 IEEE Global Communications Conference (GLOBECOM), Dec. 3-7, 2012, Anaheim, CA, USA, IEEE, 6 pages.
Non-Final Office Action for U.S. Appl. No. 17/834,661, mailed Apr. 20, 2023, 11 pages.
Notice of Allowance for U.S. Appl. No. 17/834,661, mailed Sep. 5, 2023, 13 pages.
Non-Final Office Action for U.S. Appl. No. 17/834,682, mailed Jun. 12, 2023, 16 pages.
Final Office Action for U.S. Appl. No. 17/834,682, mailed Oct. 10, 2023, 14 pages.
Advisory Action for U.S. Appl. No. 17/834,682, mailed Dec. 27, 2023, 3 pages.
Notice of Allowance for U.S. Appl. No. 17/834,682, mailed Feb. 6, 2024, 8 pages.
Non-Final Office Action for U.S. Appl. No. 17/834,697, mailed Jun. 20, 2023, 12 pages.
Notice of Allowance for U.S. Appl. No. 17/834,697, mailed Nov. 14, 2023, 12 pages.
International Search Report and Written Opinion for International Patent Application No. PCT/US2022/032694, mailed Sep. 21, 2022, 15 pages.
Written Opinion for International Patent Application No. PCT/US2022/032694, mailed Apr. 26, 2023, 6 pages.
International Preliminary Report on Patentability for International Patent Application No. PCT/US2022/032694, mailed Aug. 30, 2023, 17 pages.
International Search Report and Written Opinion for International Patent Application No. PCT/US2022/032697, mailed Sep. 29, 2022, 35 pages.
International Preliminary Report on Patentability for International Patent Application No. PCT/US2022/032697, mailed May 15, 2023, 19 pages.
International Search Report and Written Opinion for International Patent Application No. PCT/US2022/032701, mailed Sep. 22, 2022, 17 pages.

* cited by examiner

APPARATUSES, SYSTEMS, AND METHODS FOR CONTROLLING CACHE ALLOCATIONS IN A CONFIGURABLE COMBINED PRIVATE AND SHARED CACHE IN A PROCESSOR-BASED SYSTEM

PRIORITY CLAIM

The present application is a continuation of and claims priority to U.S. patent application Ser. No. 17/834,697, filed Jun. 7, 2022, and entitled "APPARATUSES, SYSTEMS, AND METHODS FOR CONTROLLING CACHE ALLOCATIONS IN A CONFIGURABLE COMBINED PRIVATE AND SHARED CACHE IN A PROCESSOR-BASED SYSTEM," which claims priority to U.S. Provisional Patent Application Ser. No. 63/208,746, filed on Jun. 9, 2021, and entitled "APPARATUSES, SYSTEMS, AND METHODS FOR CONTROLLING CACHE ALLOCATIONS IN A CONFIGURABLE COMBINED PRIVATE AND SHARED CACHE IN A PROCESSOR-BASED SYSTEM," the contents of which are incorporated herein by reference in its entirety.

BACKGROUND

I. Field of the Disclosure

The technology of the disclosure relates generally to configuring cache resources in a processor, and specifically to configuring combined private and shared cache levels in a processor.

II. Background

In order to provide low-latency retrieval of instructions and/or data (as compared to the latency of transactions to a main memory system such as a double data rate (DDR) memory, for example), microprocessors may conventionally include one or more levels of cache memory resources. These cache memory resources may be arranged in a hierarchical manner—for example, a microprocessor may have level 0 (L0), level 1 (L1), level 2 (L2), and level 3 (L3) caches, of which L0 may be the relative smallest and lowest latency, with the other caches increasing in size and latency up through the L3 cache, which may be the largest but with the longest latency compared to the other caches. In some aspects, one or more of the levels of cache hierarchy may have split instruction and data caches (e.g., the L0 cache level may comprise split L0 instruction and L0 data caches), whereas other levels of the cache hierarchy may contain both instructions and data. Some levels of the cache hierarchy may be "private" to the microprocessor or, in the case of a multi-core microprocessor, may be private to one or more individual core(s) (meaning that such private caches are only visible and accessible to the associated microprocessor or individual core(s)). Other levels of the cache hierarchy, despite being physically located with a particular microprocessor, may be shared across and usable by one or more other microprocessors in a system.

In order to efficiently utilize the available computing resources of a microprocessor, it may be desirable to run multiple applications or virtual machines on the same microprocessor. Such applications or virtual machines may have access to the shared levels of the cache hierarchy (e.g., a shared L3 cache), which may be physically distributed across the entire system (i.e., because the shared L3 cache may include portions physically located in each individual processing core, which are treated as a single logical cache from the system perspective). Because of the physically distributed nature of the shared L3 cache, an application or virtual machine running on a particular processing core of the system may have data allocated to (i.e., stored in) portions of the shared L3 cache which are relatively physically distant from the processing core on which the application or virtual machine is running. This may increase the variability of latency for transactions with respect to each processing core and result in degraded or inconsistent performance. Further, an individual application or virtual machine may consume relatively more shared L3 cache resources than another, which may lead to degraded performance for other applications or virtual machines running on the same system which may also access the same shared L3 cache resources.

SUMMARY OF THE DISCLOSURE

Aspects disclosed in the detailed description include apparatuses, systems, and methods for controlling cache allocations in a configurable combined private and shared cache in a processor-based system. The processor-based system includes a processor that includes a plurality of processing cores. The processing cores each includes execution circuits which are coupled to respective low level cache(s) and a configurable combined private and shared cache, and which may receive instructions and data on which to perform operations from the low level cache(s) and the combined private and shared cache. In an exemplary aspect, the processor-based system is configured to receive a cache allocation request to allocate a line in a share cache structure, which may further include a client identification (ID). The cache allocation request and the client ID can be compared to a sub non-uniform memory access (NUMA) (sub-NUMA) bit mask and a client allocation bit mask to generate a cache allocation vector. For example, the sub-NUMA bit mask may have been programmed to indicate that processing cores associated with a sub-NUMA region are available, whereas processing cores associated with other sub-NUMA regions are not available, and the client allocation bit mask may have been programmed to indicate that processing cores are available. Combining the sub-NUMA bit mask and the client allocation bit mask can create the cache allocation vector, which for example indicates that the cache allocation request to allocate a line may be serviced by one of processing cores.

In this regard, in one exemplary aspect, a processor-based system is provided. The processor-based system comprises a vector generation circuit responsive to a sub-NUMA bit mask and a client allocation bit mask. The processor-based system also comprises a cache selection circuit responsive to cache weighting information. The vector generation circuit is configured to receive a cache allocation request, generate an associated cache allocation vector based on the sub-NUMA bit mask and the client allocation bit mask, and provide the cache allocation vector to the cache selection circuit. The cache selection circuit is configured to receive the cache allocation vector and to select a processing core to receive the cache allocation request based on the cache weighting information and the cache allocation vector.

In another exemplary aspect, a processor-based system is provided. The processor-based system comprises a means for vector generation responsive to a sub-NUMA bit mask and a client allocation bit mask. The processor-based system also comprises a means for cache selection responsive to cache weighting information. The means for vector generation configured to receive a cache allocation request, generate an associated cache allocation vector based on the sub-NUMA bit mask and the client allocation bit mask, and provide the cache allocation vector to the means for cache selection. The means for cache selection configured to receive the cache allocation vector and to select a means for processing to receive the cache allocation request based on the cache weighting information and the cache allocation vector.

In yet another exemplary aspect, a method of providing a cache allocation request to a selected processing core of a processor is provided. The method comprises receiving a cache allocation request including a client ID. The method also comprises comparing the cache allocation request and the client ID to a sub-NUMA bit mask and a client allocation bit mask to generate a cache allocation vector. The method also comprises selecting a particular processing core to receive the cache allocation request based on the cache allocation vector and a per-processing core weighting. The method also comprises providing the cache allocation request to the selected processing core at its associated shared cache.

In yet another exemplary aspect, a non-transitory computer-readable medium stores computer executable instructions which, when executed by a processor, cause the processor to receive a cache allocation request including a client ID, compare the cache allocation request and the client ID to a sub-NUMA bit mask and a client allocation bit mask to generate a cache allocation vector, select a particular processing core to receive the cache allocation request based on the cache allocation vector and a per-processing core weighting, and provide the cache allocation request to the selected processing core at its associated shared cache.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include apparatuses, systems, and methods for controlling cache allocations in a configurable combined private and shared cache in a processor-based system. The processor-based system includes a processor that includes a plurality of processing cores. The processing cores each includes execution circuits which are coupled to respective low level cache(s) and a configurable combined private and shared cache, and which may receive instructions and data on which to perform operations from the low level cache(s) and the combined private and shared cache. In an exemplary aspect, the processor-based system is configured to receive a cache allocation request to allocate a line in a share cache structure, which may further include a client identification (ID). The cache allocation request and the client ID can be compared to a sub non-uniform memory access (NUMA) (sub-NUMA) bit mask and a client allocation bit mask to generate a cache allocation vector. For example, the sub-NUMA bit mask may have been programmed to indicate that the processing cores associated with the sub-NUMA region are available, whereas the processing cores associated with other sub-NUMA regions are not available, and the client allocation bit mask may have been programmed to indicate that processing cores are available. Combining the sub-NUMA bit mask and the client allocation bit mask can create the cache allocation vector, which for example indicates that the cache allocation request to allocate a line may be serviced by one of processing cores.

Figure 1:
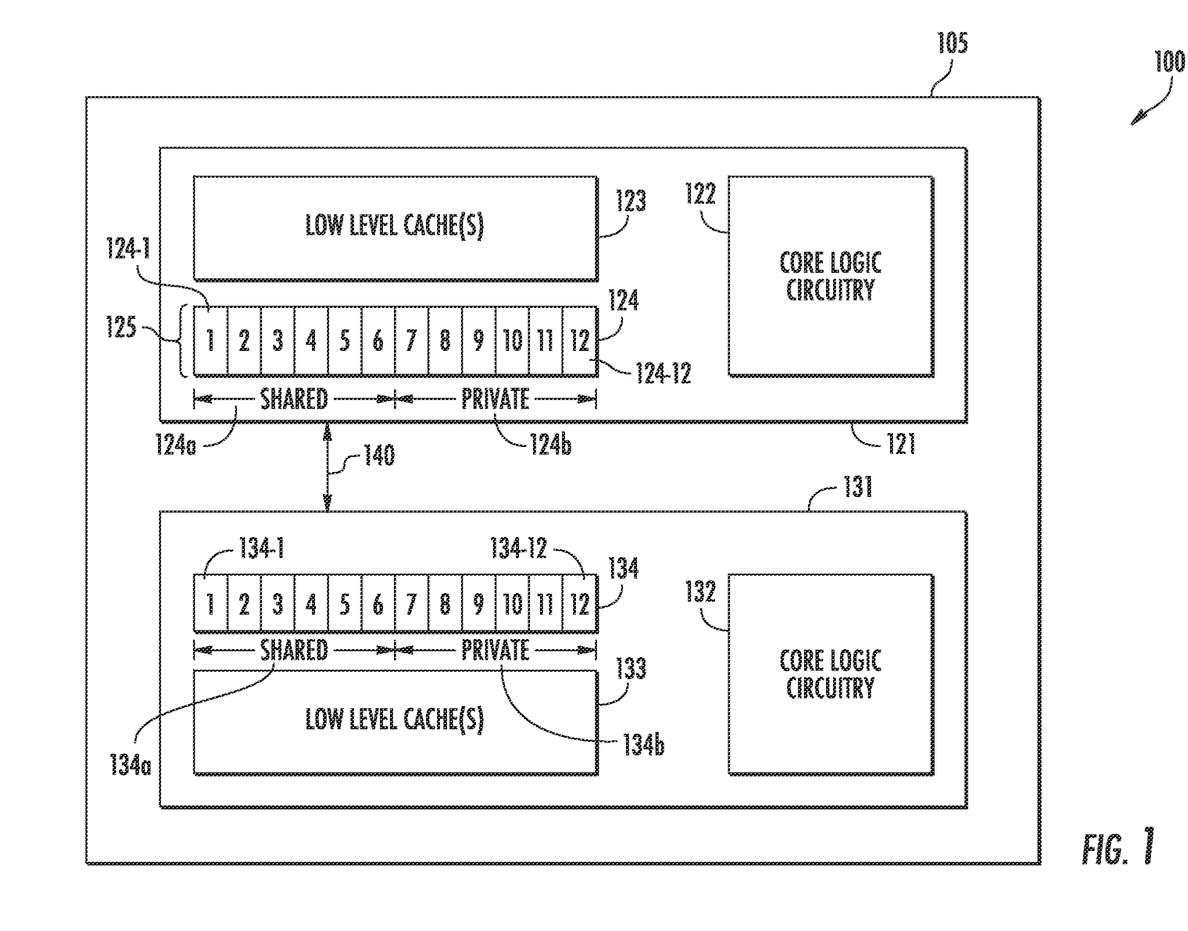
FIG. 1 is a block diagram of an exemplary system for configuring a combined private and share cache in a processor-based system.

In this regard, FIG. 1 is a block diagram of a processor-based system 100 including a processor 105 (e.g., a microprocessor) including a configurable combined private and shared cache, as will be discussed in greater detail herein. The processor 105 includes a first processing core 121 and a second processing core 131 in this example. The processing cores 121, 131 may also be referred to as "processor cores." The first processing core 121 further includes execution circuits 122, also called core logic circuitry 122, which are coupled to low level cache(s) 123 and a configurable combined private and shared cache 124, and which may receive instructions and data on which to perform operations from the low level cache(s) 123 and the combined private and shared cache 124. The low level cache(s) 123 may include L0 and L1 caches (whether split data and instruction caches, or combined), and the configurable combined private and shared cache 124 may include a private L2 and a shared L3 cache, in an aspect. The second processing core 131 further includes execution circuits 132, which are coupled to low level cache(s) 133 and a configurable combined private and shared cache 134, and which may receive instructions and data on which to perform operations from the low level cache(s) 133 and the combined private and shared cache 134. The low level cache(s) 133 may include L0 and L1 caches (whether split data and instruction caches, or combined), and the configurable combined private and shared cache 134 may include a private L2 and a shared L3 cache, in an aspect. The first processing core 121 and the second processing core 131 may communicate over an interconnect 140.

In this illustrated exemplary aspect, the configurable combined private and shared cache 124 functions as a physically combined but logically separated private L2 and shared L3 cache, illustrated as a shared L3 portion 124a and private L2 portion 124b, and includes a plurality of cache ways 125-1 through 125-12. Because the private L2 and shared L3 portions are included in the same physical cache structure, it is possible to change the relative amounts of the combined private and shared cache 124 that are devoted to private L2 and shared L3 portions respectively. To set the sizes of the shared L3 portion 124a and the private L2 portion 124b, a configuration is programmed or set in the configurable combined private and shared cache 124 which allocates a first portion of the cache ways 125-1 to 125-12 to the shared L3 portion 124a, and a second portion of the cache ways 125-1 to 125-12 to the private L2 portion 124b. The configuration of the combined private and shared cache 124 is dynamic and may be changed during operation of the processor 105, for example as part of a firmware configuration, by boot-time configuration, during system resets, during operation of the processor 105 when the contents of all caches are to be flushed or invalidated, or at other times and in other manners that will occur to those having skill in the art. The configuration may be changed over time, as the processor-based system 100 may from time to time have different applications or virtual machines allocated to run on the processor 105.

For example, at a first time, the shared L3 portion 124a may include cache ways 124-1 to 124-6, while the private L2 portion 124b may include cache ways 124-7 to 124-12. At a later time, when the processor 105 is re-booted, for example, the configuration may be changed such that the shared L3 portion 124a may include cache ways 124-1 to 124-8, while the private L2 portion 124b may include cache ways 124-9 to 124-12. In some aspects, the configurable combined private and shared cache 124 may allow complete flexibility regarding the sizes of the shared L3 portion 124a and the private L2 portion 124b (i.e., each of the portions may be set to a size anywhere from zero (0) cache ways to all cache ways of the configurable combined private and shared cache 124), whereas in other aspects, lower and/or upper limits on the size of either or both the shared L3 portion 124a and the private L2 portion 124b may be established (e.g., the private L2 portion 124b may not be smaller than two cache ways, and/or the shared L3 portion 124a may not be smaller than four cache ways). Those having skill in the art will understand that the above aspects are included by way of illustration and not by limitation, and that other configurations of the shared L3 portion 124a and the private L2 portion 124b are possible.

In the illustrated aspect, the configurable combined private and shared cache 134 may function similarly to the configurable combined private and shared cache 124, and as such may also include a shared L3 portion 134a and a private L2 portion 134b that together comprise a plurality of cache ways 134-1 through 134-12. The configurable combined private and shared cache 134 may share a configuration with the configurable combined private and shared cache 124, or may be configured differently, depending on any requirements of an associated system architecture, design considerations, or other design choices as will be apparent to those having skill in the art. As will be discussed further with respect to FIGS. 2 and 3, the configurable combined private and shared caches 124 and 134 may be configured to support controlled allocation.

Figure 2:
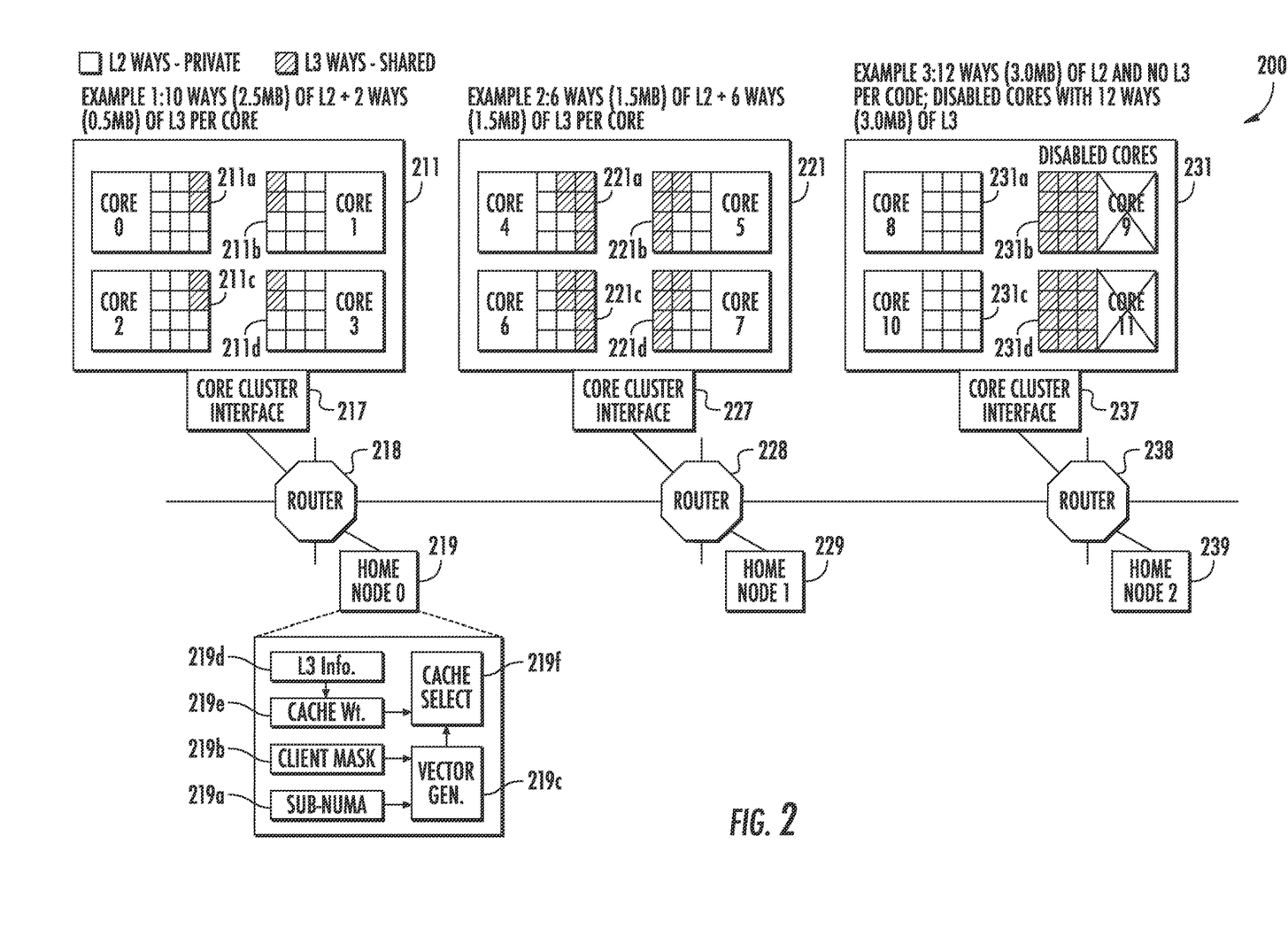
FIG. 2 is a block diagram of another exemplary system including combined private and shared caches with controlled allocation in a processor-based system.

In this regard, FIG. 2 is a block diagram of a processor-based system 200 including combined private and shared caches with controlled cache allocation. The processor-based system 200 includes a first processing cluster 211, which is coupled to a first core cluster interface 217 and a first router 218. A first home node 219 is coupled to the first router 218. The processor-based system 200 further includes a second processing cluster 221, which is coupled to a second core cluster interface 227 and a second router 228. A second home node 229 is coupled to the second router 228. The processor-based system 200 further includes a third processing cluster 231, which is coupled to a third core cluster interface 237 and a third router 238. A third home node 239 is coupled to the third router 238. The home nodes 219, 229, and 239 may manage coherency for at least a set of memory addresses of the processor-based system 200 for their associated processing clusters, which may include snooping and invalidating caches, allocating and managing the shared caches, and performing transactions with a system memory (e.g., DDR DRAM in one aspect). The routers 218, 228, and 238 may be coupled together as part of a system interconnect in order to allow the processing clusters 211, 221, and 231 to communicate and transfer instructions and data between them and to access system memory.

The first processing cluster 211 includes four (4) processing cores 211a-d. Each of the processing cores 211a-d includes a configurable combined private and shared cache which has been configured to include 10 cache ways of private cache and 2 cache ways of shared cache. The second processing cluster 221 includes four processing cores 221a-221d. Each of the processing cores 221a-221d includes a configurable combined private and shared cache which has been configured to include 6 cache ways of private cache and six (6) cache ways of shared cache. The third processing cluster 231 includes four processing cores 231a-231d, but two of the processing cores (231b and 231d) are disabled (e.g., as a result of manufacturing defects, by deliberate fusing, or other configuration methods), although their caches are still enabled and available. The two active processing cores 231a and 231c have been configured to include twelve (12) cache ways of private cache and 0 cache ways of shared cache, while the disabled processing cores 231b and 231d have been configured to include 0 cache ways of private cache (since their associated processing cores are disabled) and twelve (12) cache ways of shared cache, which may still be usable by other processing cores in the system.

Figure 3A:
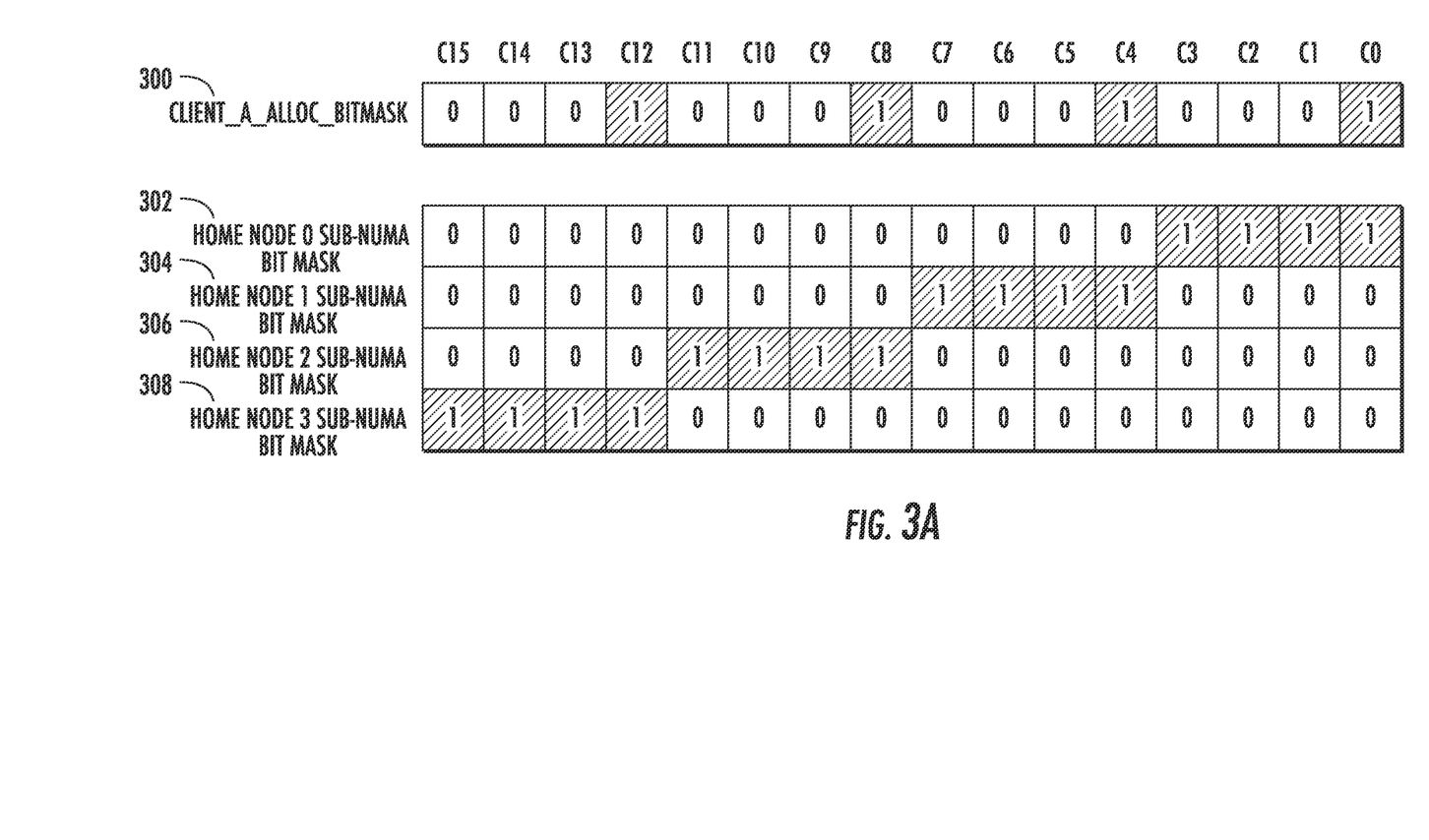
FIGS. 3A and 3B are block diagrams illustrating the use of a client allocation bit mask and sub non-uniform memory access (NUMA) (sub-NUMA) bit masks when performing controlled allocations in a combined private and shared cache, according to some aspects.
Figure 3B:
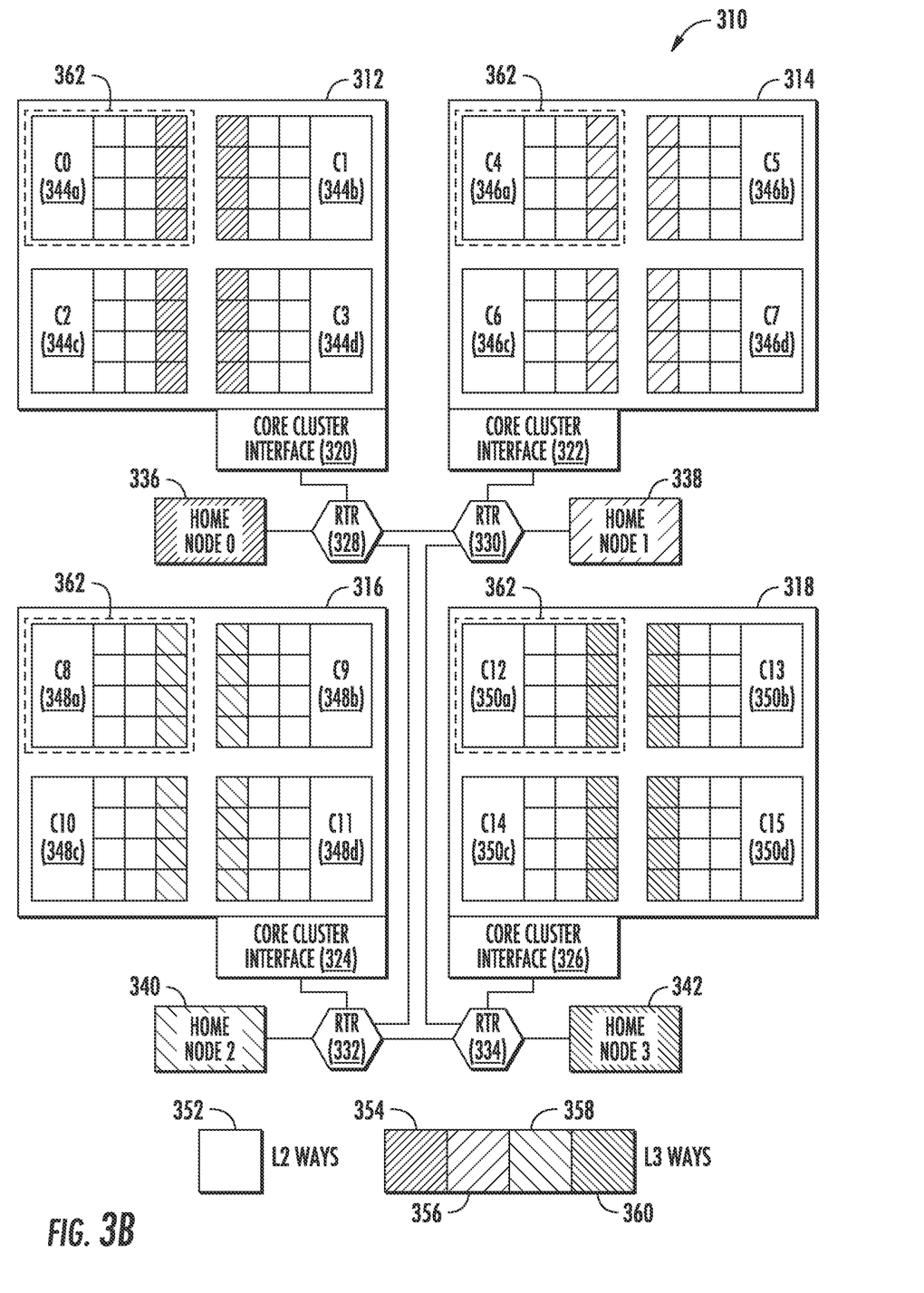

Each of the home nodes 219, 229, and 239 may be configured to control allocation of cache lines in the shared cache portions of each processing core 211a-211d, 221a-221d, and 231a-231d. For clarity of illustration, only home node 219 has been shown in detail, but it will be understood that each of the home nodes 219, 229, and 239 include analogous circuits and functionality. Home node 219 comprises a sub-non-uniform memory access (NUMA) (sub-NUMA) bit mask 219a and a client allocation bit mask 219b, which may be programmable by firmware, at system boot or reset, during run-time, or other times. For example, the sub-NUMA bit mask 219a may constrain a particular home node to use only the shared cache portion in processing cores that are included in its sub-NUMA region, and the client allocation bit mask 219b may be associated with each software process by a host operating system or virtual machine. The sub-NUMA bit mask 219a and the client allocation bit mask 219b are coupled to an allocation vector generation circuit 219c, which combines the sub-NUMA bit mask 219a and the client allocation bit mask 219b to produce a cache allocation vector, as will be described further with respect to FIG. 3. The allocation vector generation circuit 219c provides the cache allocation vector to a cache selection circuit 219f. The cache selection circuit 219f is responsive to shared cache configuration information 219d and cache weighting information 219e. Shared cache configuration information 219d may be received or derived from the configuration of the shared caches of the associated processing cluster 211 (e.g., may indicate the number of cache ways of shared cache available in each of the processing cores 211a-211d of the processing cluster 211). The shared cache configuration information 219d may be used to generate cache weighting information 219e, which is combined with the cache allocation vector by the cache selection circuit 219f to select a shared cache portion of one of the processing cores 211a-211d, 221a-221d, and 231a-231d to which to allocate a particular line. In one aspect, each of the sub-NUMA bit mask 219a and the client allocation bit mask 219b have one bit associated with each processing core 211a-211d, 221a-221d, and 231a-231d in the processor-based system 200.

FIGS. 3A and 3B illustrate the use of a client allocation bit mask (e.g., the client allocation bit mask 219b of FIG. 2) in conjunction with sub-NUMA bit masks (e.g., the sub-NUMA bit mask 219a of FIG. 2) to generate a cache allocation vector according to some aspects. FIG. 3A shows a client allocation bit mask 300 for a client associated with a client ID value A (captioned as "CLIENT_A_AL-LOC_BIT_MASK"), along with sub-NUMA bit masks 302, 304, 306, and 308 for four home nodes (captioned as "HOME NODE 0 SUB-NUMA BIT MASK," "HOME NODE 1 SUB-NUMA BIT MASK," "HOME NODE 2 SUB-NUMA BIT MASK," and "HOME NODE 3 SUB-NUMA BIT MASK," respectively). The client allocation bit mask 300 and the sub-NUMA bit masks 302, 304, 306, and 308 each are configuration registers (CRs) that are programmable by firmware and/or software processes, and that are implemented in each home node (e.g., the home nodes 219, 229, and 239 of FIG. 2). Together, they may be used to determine which processing core or cores having shared L3 cache portions may be accessed for L3 allocations by the client associated with the client ID value A.

The client allocation bit mask 300 and the sub-NUMA bit masks 302, 304, 306, and 308 in the example of FIG. 3A each comprise 16 bits, with each bit corresponding to a processing core. A bit having a value of one (1) indicates that the corresponding processing core is a valid target for allocation, while a bit having a value of zero (0) indicates that the corresponding processor core is not valid for allocation. The client allocation bit mask 300 and the sub-NUMA bit masks 302, 304, 306, and 308 provided different types of allocation control. In particular, the client allocation bit mask 300 is applied based on the client ID associated with an allocation request, and is used to restrict access by each client ID to only certain portions of the shared L3 cache portion. In some aspects, each home node maintains a client allocation bit mask for each valid client ID value. Each of the sub-NUMA bit masks 302, 304, 306, and 308 apply to the corresponding home node itself, and restricts the home node to allocating only specific portions of the shared L3 cache portion. Because each home node receives allocation requests to an exclusive subset of the overall address space, the sub-NUMA bit masks 302, 304, 306, and 308 can be used to allocate specific portions of the shared L3 cache portions to specific address ranges. Additionally, the sub-NUMA bit masks 302, 304, 306, and 308 can be used to take advantage of locality, where each home node is constrained to use only the shared L3 cache portions that are implemented in the processing cores that are physically nearest.

Some aspects may provide that the client allocation bit mask 300 and the sub-NUMA bit masks 302, 304, 306, and 308 may be used individually to control allocation, while the client allocation bit mask 300 and the sub-NUMA bit masks 302, 304, 306, and 308 may be used in combination in some aspects. In the latter case, the bit masks are combined by performing a bit-wise AND operation using the client allocation bit mask 300 and one of the sub-NUMA bit masks 302, 304, 306, and 308, resulting in a cache allocation vector that informs the home node of the set of processing cores into which an L3 allocation request can be made. The home node then selects one of these processing cores, e.g., based on a history of previous allocations and the weighting of each processing core, where the weights are proportional to the number of L3 ways in each processing core. Thus, for example, the weight-based selection algorithm would result in a processing core that is configured with eight (8) ways of shared L3 cache receiving twice as many L3 allocations as a processing core that is configured with four (4) ways of shared L3 cache.

FIG. 3B illustrates an exemplary processor-based system 310 that may make use of the client allocation bit mask 300 and the sub-NUMA bit masks 302, 304, 306, and 308 of FIG. 3A. The processor-based system 310 includes processing clusters 312, 314, 316, and 318, which are coupled to respective core cluster interfaces 320, 322, 324, and 326 and respective routers (captioned "RTR") 328, 330, 332, and 334. The routers 328, 330, 332, and 334 in turn are coupled to respective home nodes 336, 338, 340, and 342, which are captioned "HOME NODE 0," "HOME NODE 1," "HOME NODE 2," and "HOME NODE 3." The processing cluster 312 includes four (4) processing cores 344a-d. Likewise, the processing cluster 314 includes four (4) processing cores 346a-d, the processing cluster 316 includes four (4) processing cores 348a-d, and the processing cluster 318 includes four (4) processing cores 350a-d. Thus, as seen in FIG. 3B, the processing clusters 312, 314, 316, and 318 form a 2×2 mesh. It is to be understood that each element illustrated in FIG. 3B corresponds in functionality to similar elements described above with respect to FIG. 2.

Each of the processing cores 344a-d, 346a-d, 348a-d, and 350a-d includes a respective configurable combined private and shared cache for which allocation of entries into each shared cached region is configured using the client allocation bit mask 300 and the sub-NUMA bit masks 302, 304, 306, and 308 of FIG. 3A. The home nodes 336, 338, 340, and 342 are associated with respective sub-NUMA bit masks 302, 304, 306, and 308 such that the home node 336 (i.e., HOME NODE 0) only allocates into the shared L3 cache of processing cores 344a-d (i.e., C0-C3), the home node 338 (i.e., HOME NODE 1) only allocates into the shared L3 cache of processing cores 346a-d (i.e., C4-C7), and so forth in similar fashion. As seen in FIG. 3B, the private L2 cache ways are indicated by solid pattern 352, while the shared L3 cache ways into which the home nodes 336, 338, 340, and 342 may allocate are indicated by patterns 354, 356, 358, and 360, respectively. Additionally, the client allocation bit mask 300 for the client associated with the client ID value A is configured so that the client can only use the shared L3 cache of one (1) processing core per cluster (i.e., 25% of the available shared L3 cache), as indicated by dotted blocks 362.

Figure 4:
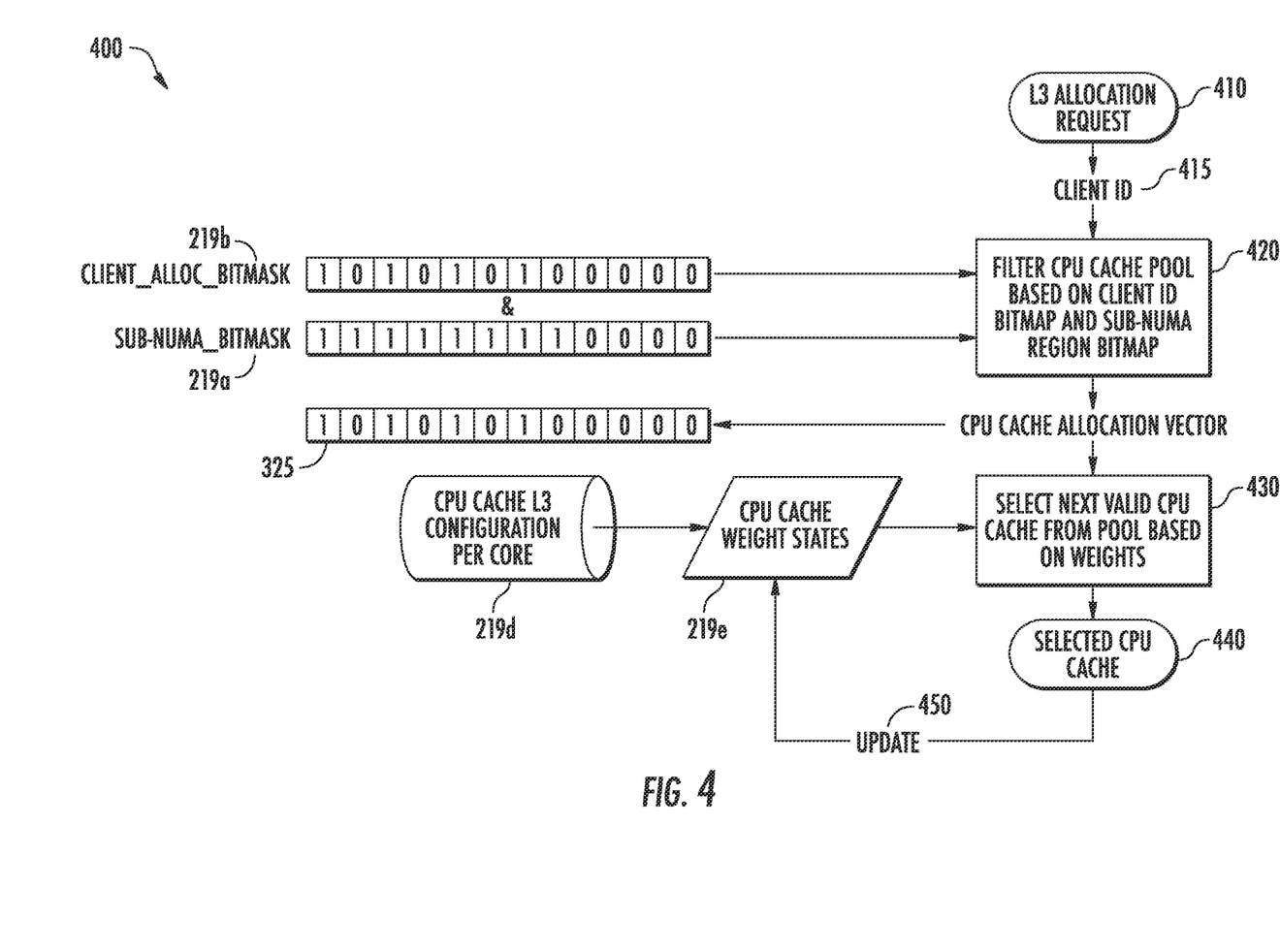
FIG. 4 is a block diagram of a method for performing controlled allocations in a combined private and shared cache in a processor-based system.

FIG. 4 is a block diagram of a method 400 for performing controlled cache allocations in a combined private and shared cache according to one exemplary aspect. The method 400 begins in block 410 by receiving a cache allocation request to allocate a line in a share cache structure (for example, the shared cache ways associated with each of processing cores 211a-211d, 221a-221d, and 231a-231d of FIG. 2), which may further include a client ID 415. The method continues at block 420, by comparing the cache allocation request and the client ID 415 to a sub-NUMA bit mask 219a and a client allocation bit mask 219b to generate a cache allocation vector 425 (which may correspond to the cache allocation vector of FIG. 2). For example, as discussed with reference to FIG. 2, the sub-NUMA bit mask 219a may have been programmed to indicate that the processing cores 211a-211d and 221a-221d associated with a sub-NUMA region are available, whereas the processing cores 231a-231d associated with other sub-NUMA regions are not available, and the client allocation bit mask 219b may have been programmed to indicate that processing cores 211a, 211c, 221a, and 221c are available. Combining these two (i.e., performing a logical AND operation on the sub-NUMA bit mask 219a and the client allocation bit mask 219b) creates the cache allocation vector 425, which for example indicates that the cache allocation request to allocate a line may be serviced by one of processing cores 211a, 211c, 221a, and 221c.

The method may further comprise selecting a particular processing core to receive the cache allocation request based on the cache allocation vector and a per-processing core weighting at block 430. For example, shared cache configuration information 219d may be received for all of the processing cores of the processor-based system 200 (including processing cores 211a, 211c, 221a, and 221c), which may indicate that processing cores 211a and 211c have two cache ways of shared cache available, and that processing cores 221a and 221c have six (6) cache ways of shared cache available. The shared cache configuration information 219d may be used to generate cache weighting information 219e (which, in an aspect, may simply be a directly proportional weight based on the number of ways available in each processing core to which a cache allocation request may be allocated). The method then continues at block 440, by providing the cache allocation request to the selected processing core at its associated shared cache. The method may further continue in block 450, by updating the per-processing core weighting, which in one aspect may be performed by selecting an initial weight value for each processing core, and then decrementing that weight value each time an allocation is performed for that processing core until the value reaches zero (0), at which time no further allocations to that processing core will be performed until all the other processing core weight values have reached zero (0), whereupon the weight values may be reset to their initial value and allocation continues as described.

Those having skill in the art will appreciate that other aspects where the allocation of requests is controlled based on different parameters are within the scope of the teachings of the present disclosure. For example, if a particular range of addresses associated with an application or virtual machine is involved in a relatively large number of transactions during a relatively short period of time, in systems where the allocation of requests is not controlled, such a range of addresses could consume a relatively large share of the total available shared cache. In such cases, the associated client may have its associated client allocation bit mask restricted to a smaller subset of processing cores (and potentially to processing cores which are physically proximate) so that it does not consume a disproportionate share of shared cache resources, which could lead to degraded system performance.

The exemplary processor including a configurable combined private and shared cache structure with controlled allocation according to aspects disclosed herein and discussed with reference to FIGS. 1-4 may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
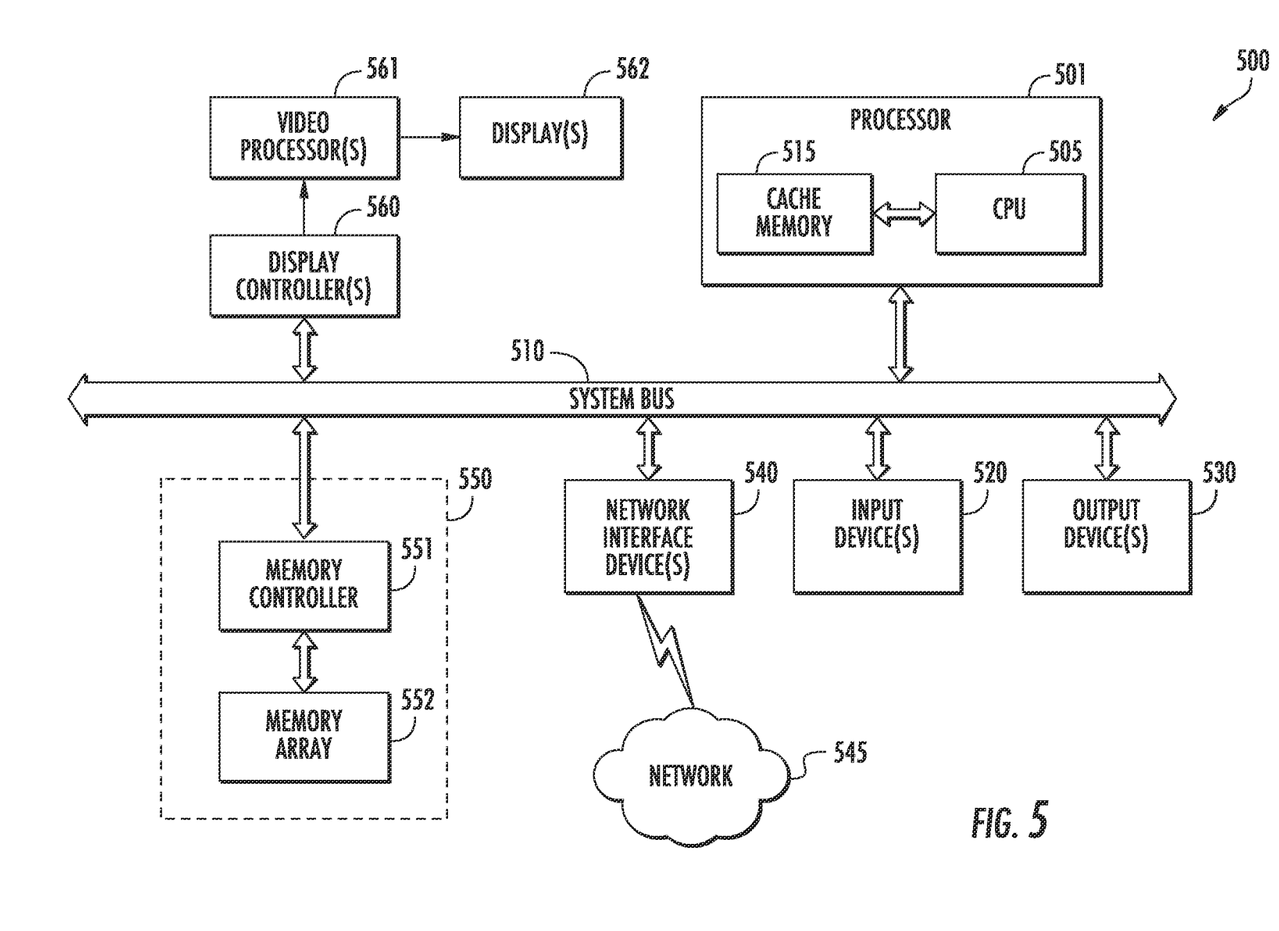
FIG. 5 is a block diagram of an exemplary processor-based system including a processor having a combined private and shared cache with controlled allocation.

In this regard, FIG. 5 illustrates an example of a processor-based system 500 that includes a configurable combined private and shared cache structure with controlled allocation as illustrated and described with respect to FIGS. 1-4. In this example, the processor-based system 500 includes a processor 501 which may include the elements of the processor-based system 200, and as such may include a configurable combined private and shared cache structure with controlled allocation as illustrated and described with respect to FIGS. 1-4. The CPU(s) 505 may be a master device. The CPU(s) 505 is coupled to a system bus 510 and can intercouple master and slave devices included in the processor-based system 500. As is well known, the CPU(s) 505 communicates with these other devices by exchanging address, control, and data information over the system bus 510. For example, the CPU(s) 505 can communicate bus transaction requests to a memory controller 551 as an example of a slave device. Although not illustrated in FIG. 5, multiple system buses 510 could be provided, wherein each system bus 510 constitutes a different fabric.

Other master and slave devices can be connected to the system bus 510. As illustrated in FIG. 5, these devices can include a memory system 550, one or more input devices 520, one or more output devices 530, one or more network interface devices 540, and one or more display controllers 560, as examples. The input device(s) 520 can include any type of input device, including, but not limited to, input keys, switches, voice processors, etc. The output device(s) 530 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory arrays 552.

The CPU(s) 505 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based system, comprising a vector generation circuit and a cache selection circuit;
   the vector generation circuit configured to:
      receive a cache allocation request including a client identifier (ID); and
      compare the cache allocation request and the client ID to a sub-Non-Uniform Memory Access (NUMA) bit mask and a client allocation bit mask to generate a cache allocation vector; and
   the cache selection circuit configured to:
      select a processing core to receive the cache allocation request based on the cache allocation vector and a per-processing core weighting; and
      provide the cache allocation request to the processing core at an associated shared cache.

2. The processor-based system of claim 1, wherein the per-processing core weighting comprises a proportional weight based on a number of ways available for allocation.

3. The processor-based system of claim 1, wherein the cache selection circuit is further configured to update the per-processing core weighting based on providing the cache allocation request to the selected processing core.

4. The processor-based system of claim 1, wherein the client allocation bit mask corresponds to the client ID of a client application, and comprises a plurality of bits each corresponding to a processor core of a plurality of processor cores and indicating whether the client application is permitted to request allocation from a shared cache of the corresponding processor core.

5. The processor-based system of claim 1, wherein the sub-NUMA bit mask corresponds to a home node of the processor-based system, and comprises a plurality of bits each corresponding to a processor core of a plurality of processor cores and indicating whether the home node is permitted to allocate from a shared cache of the corresponding processor core.

6. The processor-based system of claim 1, wherein the vector generation circuit is configured to compare the cache allocation request and the client ID to the sub-NUMA bit mask and the client allocation bit mask to generate the cache allocation vector by being configured to perform a logical AND operation using the sub-NUMA bit mask and the client allocation bit mask.

7. The processor-based system of claim 1, integrated into an integrated circuit (IC).

8. The processor-based system of claim 7, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

9. A processor-based system, comprising:
  means for receiving a cache allocation request including a client identifier (ID);
  means for comparing the cache allocation request and the client ID to a sub-Non-Uniform Memory Access (NUMA) bit mask and a client allocation bit mask to generate a cache allocation vector;
  means for selecting a processing core to receive the cache allocation request based on the cache allocation vector and a per-processing core weighting; and
  means for providing the cache allocation request to the processing core at an associated shared cache.

10. A method of controlling cache allocations in a configurable combined private and shared cache, comprising:
  receiving, by a vector generation circuit of a processor-based system, a cache allocation request;
  generating, by the vector generation circuit, an associated cache allocation vector based on a sub-Non-Uniform Memory Access (NUMA) bit mask and a client allocation bit mask;
  providing, by the vector generation circuit, the cache allocation vector to a cache selection circuit of the processor-based system;
  receiving, by the cache selection circuit, the cache allocation vector; and
  selecting, by the cache selection circuit, a processing core to receive the cache allocation request based on cache weighting information and the cache allocation vector.

11. The method of claim 10, wherein the cache weighting information comprises information regarding a number of cache ways of a shared cache from each of a plurality of processing cores.

12. The method of claim 11, wherein the shared cache of each of the plurality of processing cores is a configurable combined private and shared cache.

13. The method of claim 10, wherein the client allocation bit mask corresponds to a client identifier (ID) of a client application, and comprises a plurality of bits each corresponding to a processor core of a plurality of processor cores and indicating whether the client application is permitted to request allocation from a shared cache of the corresponding processor core.

14. The method of claim 10, wherein the sub-NUMA bit mask corresponds to a home node of the processor-based system, and comprises a plurality of bits each corresponding to a processor core of a plurality of processor cores and indicating whether the home node is permitted to allocate from a shared cache of the corresponding processor core.

15. The method of claim 10, wherein generating the associated cache allocation vector based on the sub-NUMA bit mask and the client allocation bit mask comprises performing a logical AND operation using the sub-NUMA bit mask and the client allocation bit mask.

16. A non-transitory computer-readable medium having stored thereon computer-executable instructions which, when executed by a processor, cause the processor to:
  receive a cache allocation request;
  generate an associated cache allocation vector based on a sub-Non-Uniform Memory Access (NUMA) bit mask and a client allocation bit mask;
  provide, by a vector generator, the cache allocation vector to a cache selection circuit of the processor;
  receive, by a cache selector, the cache allocation vector; and
  select a processing core to receive the cache allocation request based on cache weighting information and the cache allocation vector.

17. The non-transitory computer-readable medium of claim 16, wherein the cache weighting information comprises information regarding a number of cache ways of a shared cache from each of a plurality of processing cores.

18. The non-transitory computer-readable medium of claim 17, wherein the shared cache of each of the plurality of processing cores is a configurable combined private and shared cache.

19. The non-transitory computer-readable medium of claim 16, wherein the client allocation bit mask corresponds to a client identifier (ID) of a client application, and comprises a plurality of bits each corresponding to a processor core of a plurality of processor cores and indicating whether the client application is permitted to request allocation from a shared cache of the corresponding processor core.

20. The non-transitory computer-readable medium of claim 16, wherein the sub-NUMA bit mask corresponds to a home node of a processor-based system, and comprises a plurality of bits each corresponding to a processor core of a plurality of processor cores and indicating whether the home node is permitted to allocate from a shared cache of the corresponding processor core.

* * * * *